United States Patent
Hammerschmidt

(10) Patent No.: US 7,528,755 B2
(45) Date of Patent: May 5, 2009

(54) SIGMA-DELTA MODULATOR FOR OPERATING SENSORS

(75) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 11/850,913

(22) Filed: Sep. 6, 2007

(65) Prior Publication Data

US 2009/0066550 A1    Mar. 12, 2009

(51) Int. Cl.
*H03M 3/00* (2006.01)
(52) U.S. Cl. .................................. 341/143; 341/155
(58) Field of Classification Search .................. 341/143
See application file for complete search history.

(56) References Cited

U.S. PATENT DOCUMENTS

| | | | |
|---|---|---|---|
| 3,673,336 A | 6/1972 | Thomas | |
| 5,101,450 A | 3/1992 | Olshansky | |
| 5,325,399 A | 6/1994 | Haspeslagh et al. | |
| 5,440,939 A | 8/1995 | Barny et al. | |
| 5,454,266 A * | 10/1995 | Chevroulet et al. | 73/514.18 |
| 5,768,316 A | 6/1998 | Sogo | |
| 5,974,895 A * | 11/1999 | Steger et al. | 73/769 |
| 5,990,578 A * | 11/1999 | Krauss | 307/116 |
| 6,044,307 A | 3/2000 | Kamiya | |
| 6,087,969 A | 7/2000 | Stockstad et al. | |
| 6,101,864 A | 8/2000 | Abrams et al. | |
| 6,188,340 B1 * | 2/2001 | Matsumoto et al. | 341/110 |
| 6,301,965 B1 * | 10/2001 | Chu et al. | 73/514.18 |
| 6,356,085 B1 * | 3/2002 | Ryat et al. | 324/658 |
| 6,470,126 B1 | 10/2002 | Mukasa | |
| 6,658,310 B1 | 12/2003 | Kamiya | |
| 6,684,711 B2 * | 2/2004 | Wang | 73/724 |
| 6,691,572 B1 * | 2/2004 | Handrich | 73/514.18 |
| 6,879,056 B2 * | 4/2005 | Kemp et al. | 307/10.1 |
| 7,288,946 B2 * | 10/2007 | Hargreaves et al. | 324/678 |
| 7,340,955 B2 * | 3/2008 | Manninen | 73/514.32 |
| 2002/0012389 A1 | 1/2002 | Wildhagen | |
| 2004/0034499 A1 | 2/2004 | Regier | |
| 2004/0189090 A1 | 9/2004 | Yanagida et al. | |

FOREIGN PATENT DOCUMENTS

| | | |
|---|---|---|
| CA | 2072526 | 12/1992 |
| DE | 693 11 831 T2 | 10/1997 |
| DE | 10 2004 010 661 A1 | 10/2005 |
| DE | 10 2005 046 699 A1 | 4/2007 |
| EA | 001361 | 2/2001 |

(Continued)

*Primary Examiner*—Khai M Nguyen
(74) *Attorney, Agent, or Firm*—Slater & Matsil, L.L.P.

(57) ABSTRACT

A sigma-delta modulator can be used for actuating a sensor element. The sigma delta modulator includes: a forward branch to which an input signal is fed at an input and which includes a loop filter, a quantizer and an output for providing an output signal. A feedback branch is configured to feed back the output signal of the forward branch at least temporarily to the input of the forward branch. A signal source is configured to generate a readout signal which corresponds to the voltage profile at the sensor element during a measuring process. A control unit is configured to generate a control signal dependent on which either the output signal of the forward branch or the readout signal of the signal source is fed back to the input of the forward branch.

17 Claims, 5 Drawing Sheets

FOREIGN PATENT DOCUMENTS

| | | |
|---|---|---|
| GB | 1 241 905 | 8/1971 |
| GB | 1 280 045 | 7/1972 |
| GB | 1 320 911 | 6/1973 |
| JP | 56-122545 | 9/1981 |
| JP | 58-114675 | 7/1983 |
| JP | 2-123857 | 5/1990 |
| JP | 2-232865 | 9/1990 |
| JP | 4-335725 | 11/1992 |
| JP | 6-177770 | 6/1994 |
| JP | 6-209266 | 7/1994 |
| JP | 8-172614 | 7/1996 |
| JP | 9-167974 | 6/1997 |
| JP | 10-145232 | 5/1998 |
| JP | 10-233687 | 9/1998 |
| JP | 11-355142 | 12/1999 |
| JP | 2002-372730 A | 12/2002 |
| JP | 2004 96601 A | 3/2004 |
| JP | 2004-241992 A | 8/2004 |
| JP | 2005-323205 | 11/2005 |
| TW | 441191 B | 6/2001 |
| WO | WO 93/24809 | 12/1993 |
| WO | WO 00/25158 | 5/2000 |

\* cited by examiner

SIGMA-DELTA MODULATOR FOR OPERATING SENSORS

TECHNICAL FIELD

An embodiment of the present invention relates to a circuit for operating a sensor, in particular a sigma-delta modulator for operating a capacitive gyroscopic sensor (e.g., a rotational speed sensor or a yaw rate sensor).

BACKGROUND

Micromechanical gyroscopic sensors are, after pressure sensors, currently the most frequently produced sensors in silicon micromechanics. Modern micromechanical technologies permit a decisive reduction in sizes and costs as well as integration with the electronics of a sensor. This has enabled a large number of new application fields to be opened up. These include the areas of the automobile industry, biomechanics, consumer goods industry, industrial applications, military applications and navigation. Airbag sensors, Electronic Stability Control (ESC), stabilization of video cameras, 3-D mouse devices and sensor systems for navigation devices are only a few of the applications under development. The current largest market for micromechanical rotational speed sensors is the automotive industry. These sensors can be used to measure acceleration and rotational movement of a vehicle in order to prevent the vehicle from tipping over or skidding in dangerous driving situations by braking individual wheels or by intervention in the vehicle suspension system. If, nevertheless, an accident occurs, it is possible for "intelligent" triggering of the front and side airbags to take place.

The measuring principle is based on Foucault's Pendulum which, while oscillating freely in a plane, carries out a precession movement when subjected to a rotational movement. For the measurement of the rotational speed (angular speed, also yaw rate) one may choose between an open-loop or closed-loop operating principle. In both cases it is necessary for the "pendulum", i.e., the micromechanical gyroscopic sensor, to be excited with a primary oscillation of a constant amplitude and constant direction.

In open-loop operation, energy is transmitted from the oscillation amplitude of the primary oscillation to a secondary oscillation due to an external rotational movement. The ratio of the amplitudes of the primary and secondary oscillation is proportional to the rotational speed of the sensor. In closed-loop operation, the secondary oscillation is compensated for by using a closed control loop, and the actuating variable (i.e., the restoring forces) of the controller being necessary for this is a measure of the secondary oscillation. Compensating for the secondary oscillation allows the bandwidth of the rotational speed sensor to be increased significantly.

The primary oscillation is excited in micromechanical rotational speed sensors, which are typically in the form of two oscillating capacitor plates, using electrostatic forces, i.e., the electrodes (i.e., the "capacitor plates") of the rotational speed sensor oscillate by applying an electrical voltage to them. The amplitude and the frequency of the primary oscillation can furthermore also be adjusted by control loops to specific values (for example, to a frequency range of mechanical resonance). The rotational speed sensor can therefore form an electrically excited mechanical resonator. This generally requires information about the current position of the resonator, in simplified terms the position of the "capacitor plates". For this purpose, the capacitance of the sensor can be measured. This is known to be a measure of the distance between the plates in plate capacitors.

In order to generate the primary oscillation and the restoring forces, analogous control voltages have to be generated in a costly way. If, in order to excite the primary oscillation of the rotational speed sensor or to compensate for the secondary oscillation and to measure the position of the respective oscillator, the same "capacitor plates" are used, these analog control voltages must also be switched over using multiplexers, depending on whether the sensor is currently excited or whether a measuring process is taking place, with the multiplexing of the analog signals with the required precision being a problem whose solution entails a considerable degree of expenditure on circuitry. However, there is a general need for a circuit for operating gyroscopic sensors which require the smallest possible degree of expenditure on circuitry while providing the necessary precision.

SUMMARY OF THE INVENTION

According to one example of an embodiment of the invention, a sigma-delta modulator for operating a sensor element, in particular, a micromechanical resonator, comprises: a forward branch to which an input signal is fed at an input and which comprises a loop filter, a quantizer and an output for making available an output signal; a feedback branch which is configured to feed back the output signal of the forward branch at least temporarily to the input of the forward branch; a signal source which is configured to generate a readout signal which corresponds to the voltage profile at the sensor during a readout process; a control unit which is configured to generate a control signal dependent on either the output signal of the forward branch or the readout signal of the signal source fed back to the input of the forward branch.

In one example of an embodiment of the invention, the feedback branch of the sigma-delta modulator can comprise a multiplexer being controllable by means of the control signal. The output signal of the forward branch and the readout signal of the signal source are fed to the multiplexer. Dependent on the control signal, one of the two signals is output by the multiplexer and as a result fed back to the input of the forward branch.

In a further example of an embodiment of the invention, the sigma-delta modulator can have a digital/analog converter to which the fed back signal is fed. The output of the digital/analog converter is connected at least indirectly to the sensor element.

BRIEF DESCRIPTION OF THE DRAWINGS

Embodiments of the invention can be better understood with reference to the following drawings and descriptions. The components in the figures are not necessarily to scale, emphasis instead being placed upon illustrating the principles of the invention. Moreover, in the figures, like reference numerals designate corresponding parts. In the drawings.

DETAILED DESCRIPTION OF ILLUSTRATIVE EMBODIMENTS

Figure 1:
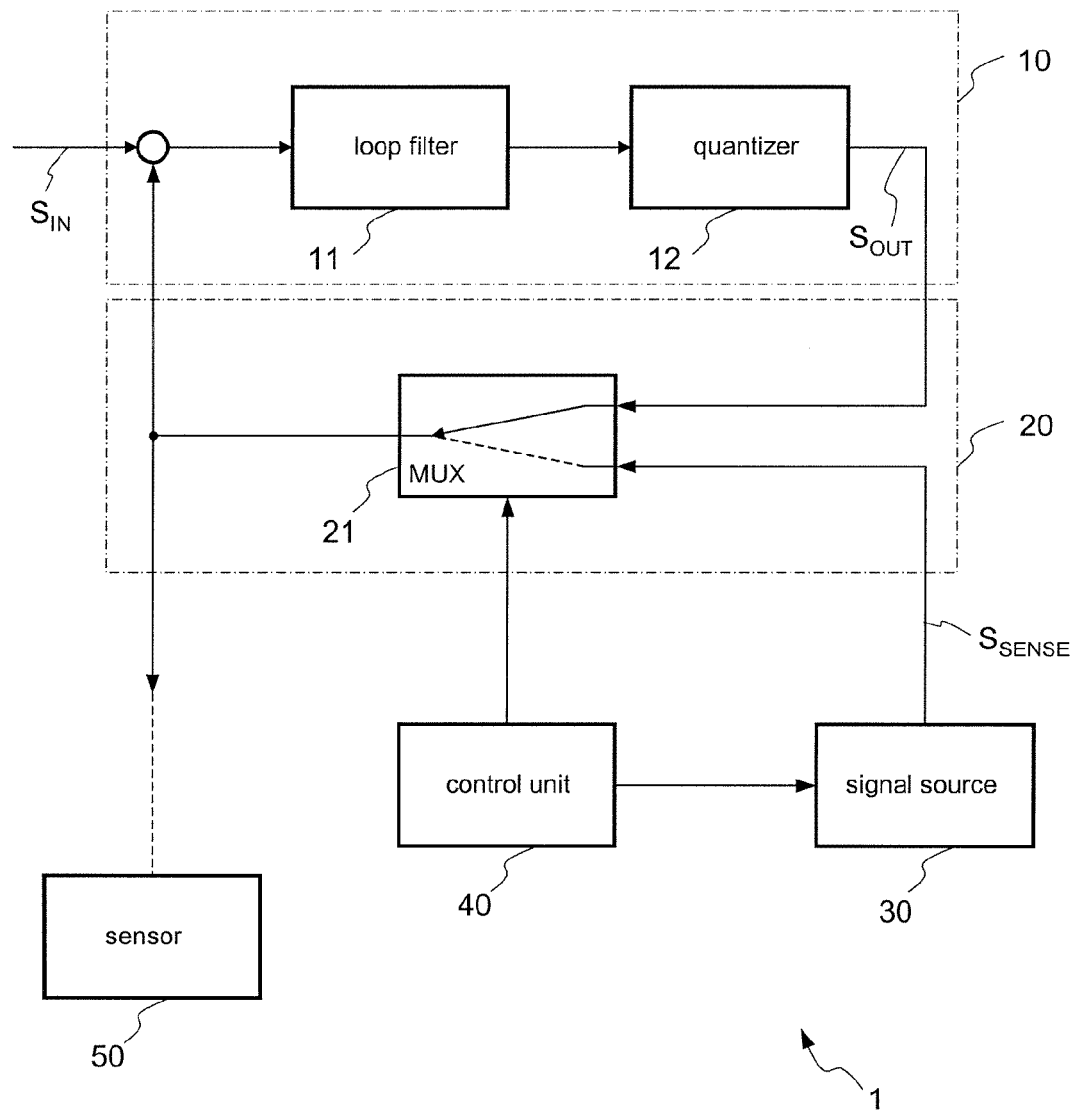
FIG. 1 is a block circuit diagram of a sigma-delta modulator for actuating a micromechanical resonator for measuring rotational speeds.

FIG. 1 illustrates a first example of an embodiment of the invention in a block circuit diagram. The illustrated circuit is a sigma-delta modulator 1 which is used as an "output stage" for actuating a sensor, in particular a micromechanical rotational speed sensor. An input signal $S_{IN}$ is fed to the sigma-delta modulator. This input signal is typically a digital signal and can be considered, for example, to be a "setpoint value" for the primary oscillation of the sensor element (i.e., of the micromechanical resonator in the form of two parallel capacitor plates) or as a manipulated variable for modulating the secondary oscillation. The sigma-delta modulator serves, inter alia, to generate an analog output signal from the digital input signal $S_{IN}$, by means of which output signal the sensor element can be excited to oscillate. In the above-mentioned closed-loop operating mode, the output signal can, however, also constitute the actuating variable for compensating for the secondary oscillation. In this case the input signal $S_{IN}$ would be a measure of the necessary restoring forces for compensating for the secondary oscillation, and thus also a measure of the rotational speed itself.

The sigma-delta modulator comprises a forward branch 10 with a loop filter 11 and a quantizer 12. The forward branch has an input to which the input signal $S_{IN}$ is fed, and an output at which an output signal $S_{OUT}$ of the forward branch is made available. In addition, the sigma-delta modulator comprises a feedback branch 20 which is designed to feed back the output signal $S_{OUT}$ of the forward branch at least temporarily to the input of the forward branch. For this purpose, the output signal $S_{OUT}$ can be subtracted from the input signal $S_{IN}$ at the input of the forward branch 10, at least temporarily.

While the output signal $S_{OUT}$ of the forward branch is fed back to the input of the forward branch, the function of the sigma-delta modulator from FIG. 1 corresponds to that of a conventional sigma-delta modulator, details of whose function are not given here. In this context, only the properties of the sigma-delta modulator relating to noise shaping are important. Given corresponding oversampling, in a sigma-delta modulator, the noise power of the quantization noise is shifted to frequencies outside the frequency range of a useful signal and the signal-to-noise interval of the output signal $S_{OUT}$ in the frequency range of the useful signal is thus improved.

This noise shaping property of the sigma-delta modulator is an important reason for its use for actuating micromechanical sensor elements. The sensor element 50 is excited to oscillate by the output signal $S_{OUT}$ of the forward branch 10. As already described above, it is, however, also necessary to determine the current position of the sensor element 50 at regular intervals. This can be implemented, for example, by measuring the capacitance of the sensor element.

Figure 2A:
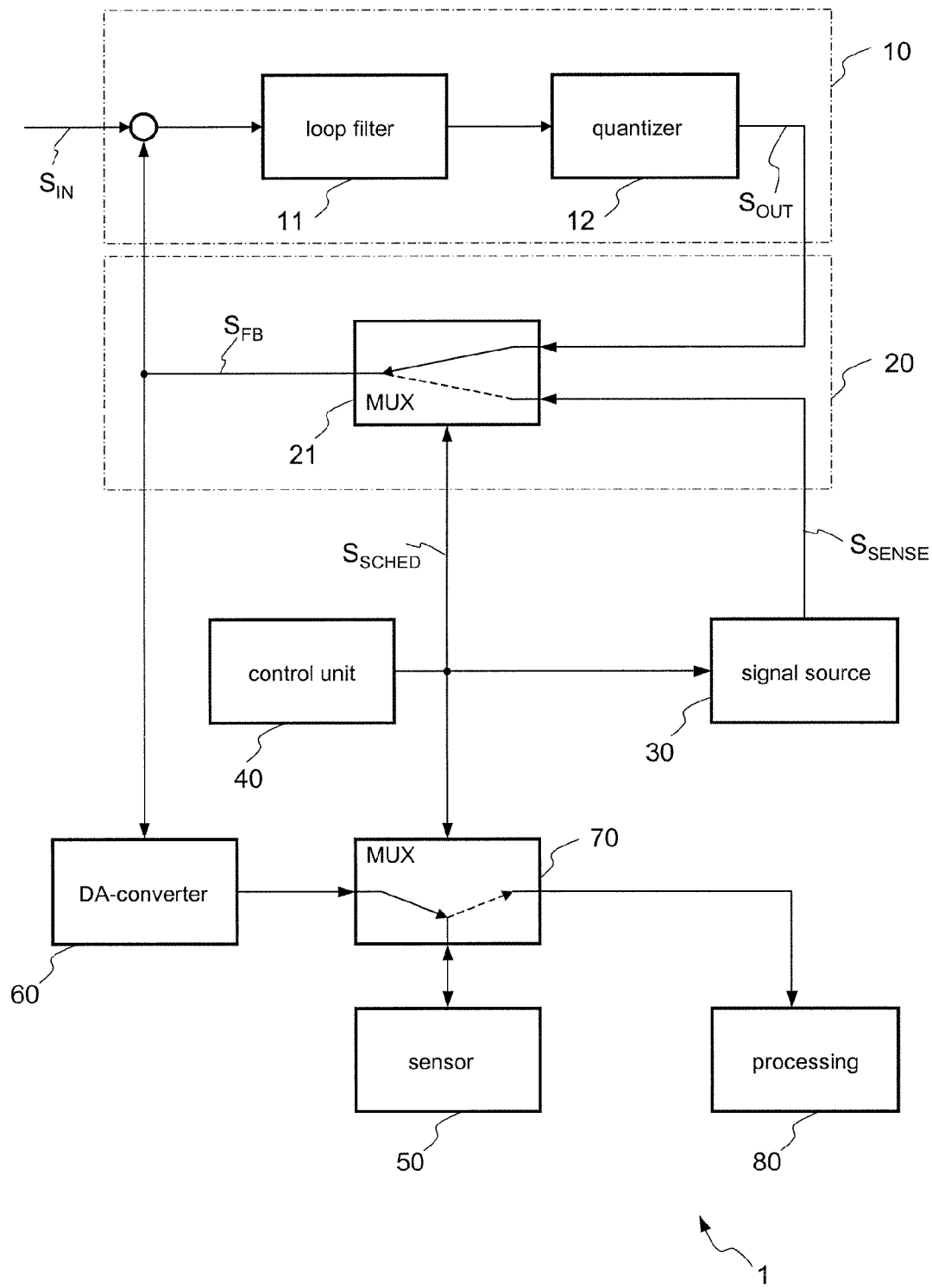
FIGS. 2a and 2b, referred to collectively as FIG. 2, are block circuit diagrams of the sigma-delta modulator having two multiplexers, in which two different switched states of the multiplexers are represented.
Figure 2B:
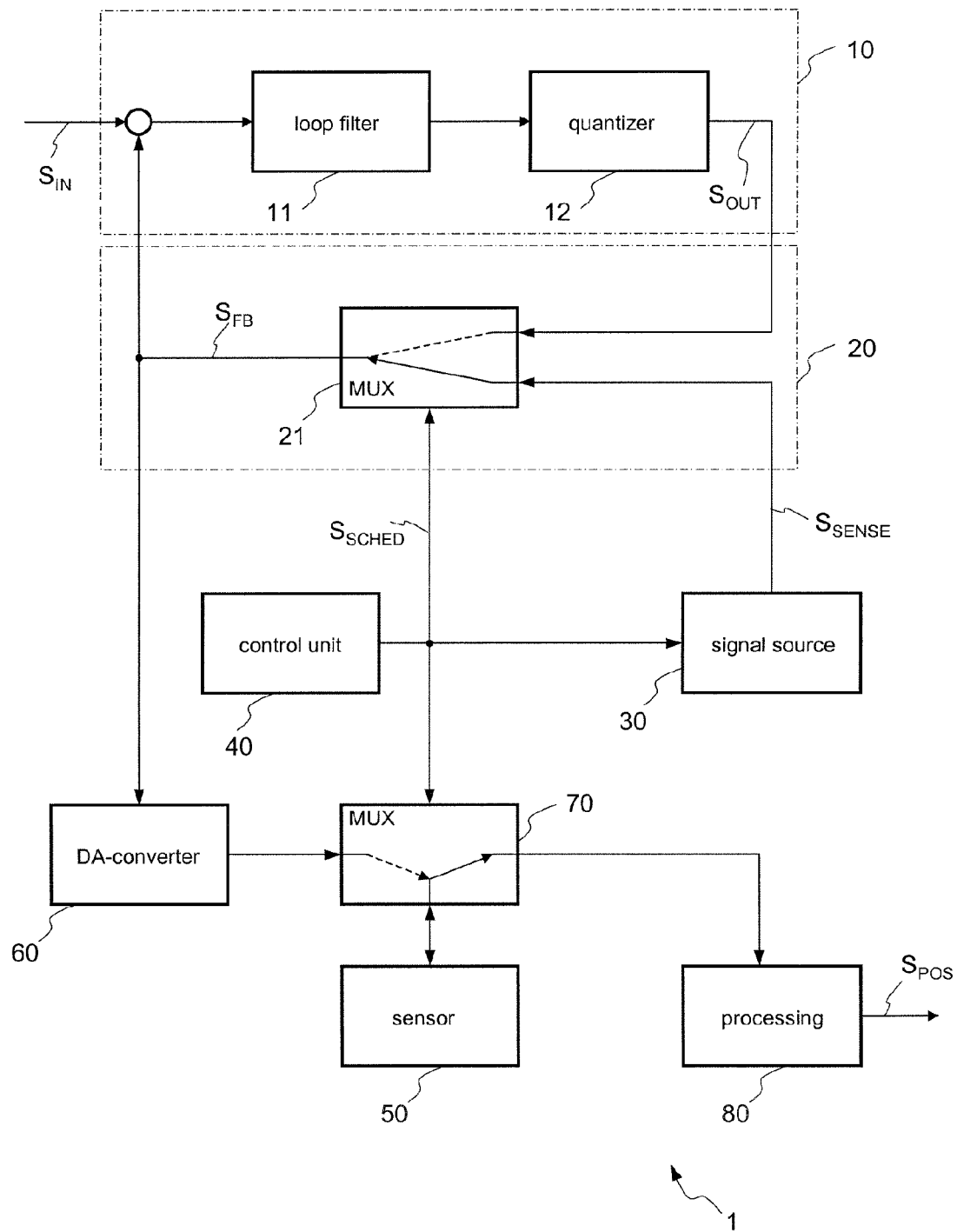

For this purpose, the electrodes of the sensor element are usually first charged to a defined voltage, and the charge on the electrode is subsequently evaluated as a measure of the capacitance. The electrodes are discharged to a further defined voltage for this purpose and the charge which flows away from the electrodes in this context is measured using a charge amplifier. The capacitance of the sensor element can be calculated from the difference between the voltage before and the voltage after the discharging process and the charge which has flowed away in the process. During such a measuring process, the output signal $S_{OUT}$ is not present at the electrodes of the sensor element 50 but rather a readout signal which represents the voltage profile at the electrodes of the sensor element 50 during a measuring process. After a measuring process has ended, the output signal $S_{OUT}$ of the forward branch is fed to the electrodes of the sensor element 50 again in order to be able to actuate the sensor element 50 actively again. The functionality of such a measuring process is implemented in the measuring circuit 80 (FIGS. 2a and 2b). The latter makes available, as output signal, a position signal $S_{Pos}$ which represents the deflection of the micromechanical resonator of the sensor element 50 (FIG. 2b).

A measuring process is triggered by a control signal $S_{SCHED}$ of a control unit ("scheduler") 40. The repetition rate of the measuring processes typically exceeds the frequency of the input signal $S_{IN}$ and that of the output signal $S_{OUT}$ by a multiple. Exemplary signal profiles are explained in more detail below with reference to FIG. 3.

During a measuring process, the voltage at the electrodes of the sensor element 50 is not determined by the output signal $S_{OUT}$ but is instead predefined by a measuring circuit. After the measuring process has ended, the voltage at the electrodes of the sensor element generally differs from that of the output signal $S_{OUT}$, which leads to a "disruption" in the feedback loop (10, 20) of the sigma-delta modulator and to worsening of the noise shaping properties.

The noise shaping of the sigma-delta modulator is known to be based on an error feedback, i.e., an error signal is formed by the feeding back (in the present case a negative feedback) of the output signal $S_{OUT}$ to the input signal $S_{IN}$, whereby the error signal is fed to the quantizer 12 via the loop filter 11. In order to obtain the important noise shaping properties of the sigma-delta modulator and in order to prevent the noise which has been shifted to high frequencies from being demodulated in frequency ranges of the input signal, in the present example of an embodiment of the invention the feedback branch 20 is disconnected during a measuring process and a readout signal $S_{SENSE}$ is fed back to the input of the forward branch instead of the output signal $S_{OUT}$, in which case the readout signal $S_{SENSE}$ represents the voltage profile at the electrodes of the sensor element 50 during a measuring process. As a result, the "error" in the electrode voltage which is caused by the measuring process is taken into account in the feedback loop and the noise shaping properties of the sigma-delta modulator are retained during a measuring process despite differing electrode voltages.

For this purpose, the feedback branch can have an electronic switch, for example, a multiplexer 21, which can be controlled by the control signal $S_{SCHED}$ in such a way that during a measuring process it is not the output signal $S_{OUT}$ of the forward branch 10 which is fed back but instead the readout signal $S_{SENSE}$. The sigma-delta modulator comprises a signal source 30 which generates the readout signal $S_{SENSE}$. The readout signal $S_{SENSE}$ represents at least approximately the voltage profile at the electrodes of the sensor element 50 during a measuring process. The control unit 40 triggers both the signal source 30 and the multiplexer 21 at the start of each measuring process.

There are different possible ways of connecting the sensor element 50 to the sigma-delta modulator. One possible way is illustrated in FIGS. 2a and 2b, which show a further example of an embodiment of the invention in a block circuit diagram. The sigma-delta modulator 1 from FIG. 2a comprises all the features of the sigma-delta modulator from FIG. 1 and additionally a digital/analog converter 60, a further multiplexer 70 and a measuring circuit 80. Compared to the circuit from FIG. 1, the connection of the sensor element 50 to the sigma-delta modulator is illustrated in more detail.

The digital/analog converter 60 converts the fed back signal ($S_{OUT}$ or $S_{SENSE}$) into an analog signal which is fed to the sensor via the further multiplexer 70. The further multiplexer 70 is also actuated by means of the control signal $S_{SCHED}$ of the control unit 40, specifically in such a way that during a measuring process the sensor element 50 is connected to the measuring circuit 80, and during other operating modes it is, however, connected to the D/A converter 60. The switched settings of the multiplexer 21 and of the further multiplexer 70 are not independent of one another. The further multiplexer 70 connects the D/A converter 60 to the sensor element 50 whenever the multiplexer 21 feeds back the output signal $S_{OUT}$ of the forward branch 10 to its input. Conversely, the further multiplexer 70 connects the sensor element 50 to the measuring circuit 80 whenever the readout signal $S_{SENSE}$ of the signal source 30 is connected to the input of the forward branch 10. FIG. 2a shows the switch settings of the multiplexers 21 and 70 during normal operation of the sigma-delta modulator. The otherwise identical FIG. 2b shows the switch settings of the multiplexers 21 and 70 during a measuring process of the sigma-delta modulator 1.

The signal source 30 generates, as readout signal $S_{SENSE}$, a signal which represents the voltage profile at the electrodes of the sensor element 50 during a measuring process. This signal can be generated by the signal source, for example, by computational means using a mathematical model or using values of the charge and discharge curves of the electrode capacitance, which are stored in table form. The signal source does not necessarily have to generate the readout signal $S_{SENSE}$ "independently", i.e., using a model, but rather can also tap a signal representing the electrode voltage at the sensor element 50 during a measuring process at the measuring circuit. In this case, the signal source 30 would have to have an analog/digital converter which is connected to the measuring circuit 80 so that the analog/digital converter can make available a digital signal, as readout signal $S_{SENSE}$, which represents the actual electrode voltage at the sensor element 50. If, as mentioned above, the readout signal $S_{SENSE}$ is generated by computational means, the entire sigma-delta modulator 1, with the exception of the multiplexer 70 and the digital/analog converter 60, can be implemented using digital technology.

Figure 3:
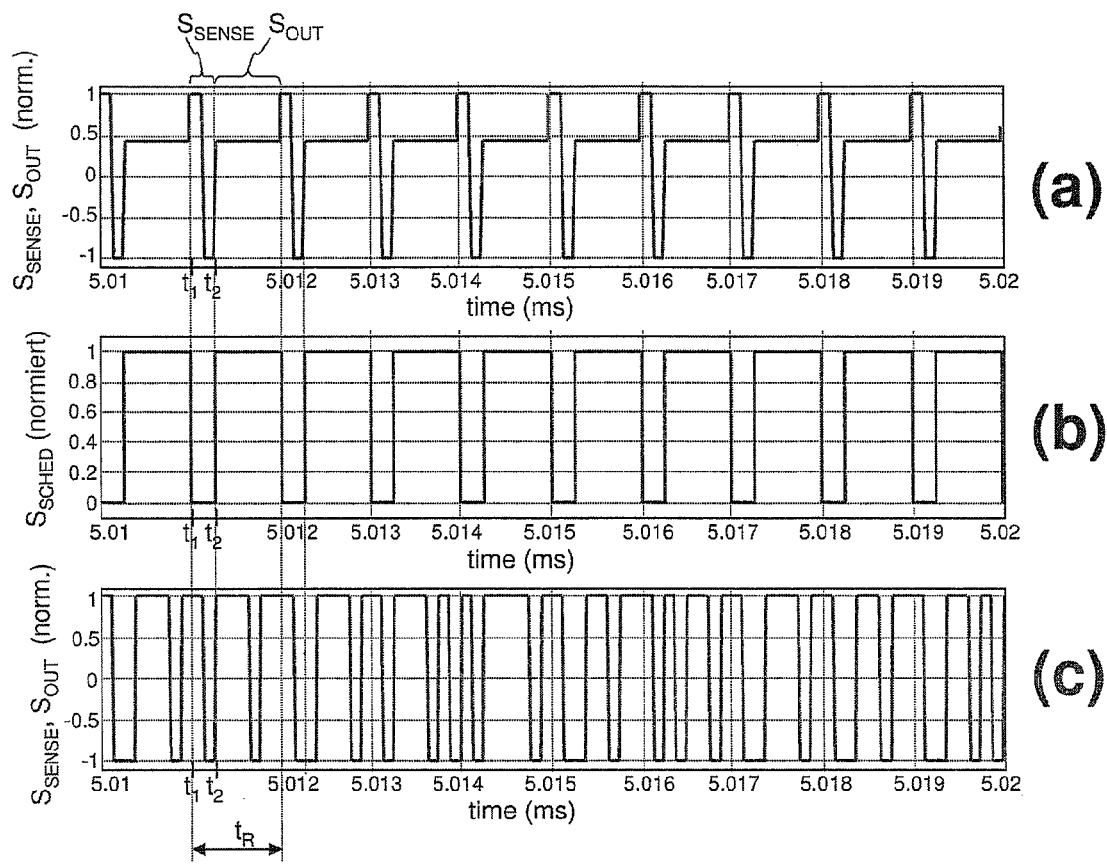
FIG. 3 is a time diagram of the essential signal profiles in the sigma-delta modulator from FIG. 2.

FIG. 3 comprises time diagrams of the relevant signal profiles of the circuit from FIG. 2. The second diagram (FIG. 3b) shows by way of example a possible control signal $S_{SCHED}$ which is illustrated standardized to the interval [0, 1] in the present case. The control signal $S_{SCHED}$ is a logic signal. A high level signifies a switch setting of the multiplexers 21 and 70 as illustrated in FIG. 2a, a low level signifies a switch setting of the multiplexers 21 and 70 corresponding to FIG. 2b. A measuring process is therefore triggered by a low level or by a trailing edge of the control signal $S_{SCHED}$ at a time $t_1$. After a measuring process has ended at a time $t_2$, the control signal $S_{SCHED}$ returns to a high level and the normal operation of the sigma-delta modulator is continued, i.e., the output signal $S_{OUT}$ of the forward branch 10 of the sigma-delta modulator 1 is fed back again to its input.

The first time diagram (FIG. 3a) shows the feed back signal, i.e., the output signal of the multiplexer 21 which is represented standardized to the interval [−1, 1] in the present case. This feed back signal corresponds in certain sections to the output signal $S_{OUT}$ of the forward branch 10 or to the readout signal $S_{SENSE}$. As long as the control signal $S_{SCHED}$ has a high level, the output signal $S_{OUT}$ is fed back and the sigma-delta modulator is in the normal operating mode. At the start of a measuring process at the time $t_1$, the readout signal $S_{SENSE}$ is fed back and the feed back signal between the times $t_1$ and $t_2$ mirrors the voltage at the electrodes of the sensor element 50 during a measuring process. The electrodes are first charged to a specific voltage value (here to the standardized value 1) and subsequently discharged to a further defined potential (here to the standardized value −1).

The signal illustrated in FIG. 3a corresponds essentially also to the voltage profile at the electrodes of the sensor element 50. The signal profile from FIG. 3a has been determined for a 6 bit quantizer. In the case of a sigma-delta modulator, 1 bit quantizers are generally used. A quantization with 6 bits (64 quantization stages) has been illustrated only for the sake of better illustration. In practice, a 1 bit quantizer is, of course, also used in an embodiment of the present invention.

The signal corresponding to FIG. 3a when a 1 bit quantizer is used is illustrated in FIG. 3c. During a measuring process, the voltage profile at the electrodes of the sensor element 50 also corresponds to the readout signal $S_{SENSE}$. However, the output signal $S_{OUT}$ of the forward branch can assume only the amplitude values −1 and 1. However, the mean value of the output signal $S_{OUT}$ from FIG. 3c corresponds, apart from quantization errors, to the value of the output signal shown in FIG. 3a (approximately 0.4). For this reason, when a 1 bit quantizer 12 is used, the digital/analog converter 60 can be formed by a low pass filter.

Figure 4:
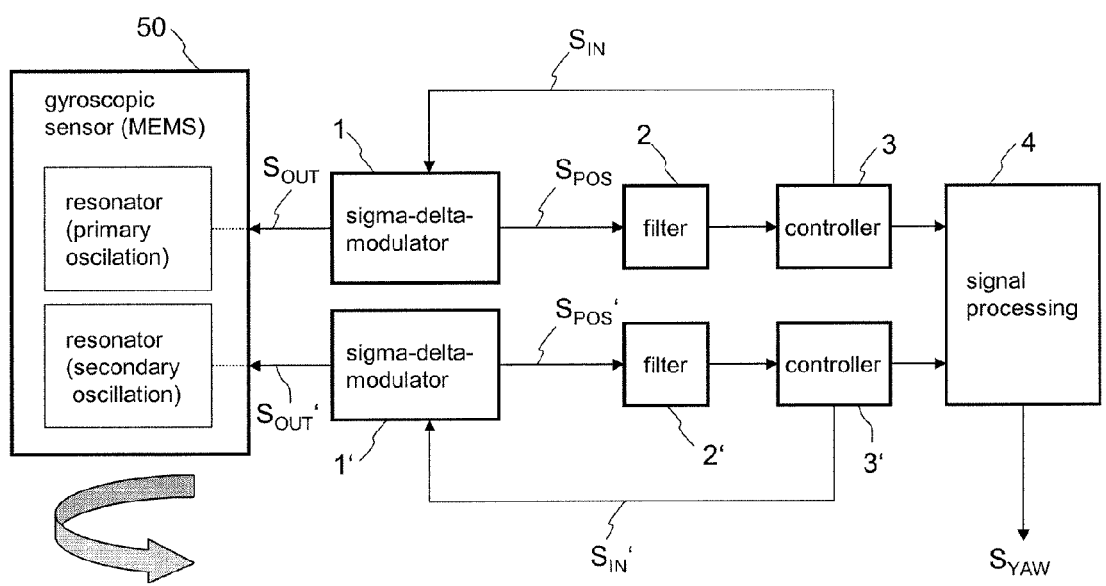
FIG. 4 is a block circuit diagram of a gyroscopic rotational speed sensor with micromechanical sensor element, sigma-delta modulator, controller and a signal processing means.

FIG. 4 illustrates a block circuit diagram of the total system of a gyroscopic rotational speed sensor. This comprises in addition to the sensor element 50 at least one sigma-delta modulator 1 corresponding to FIGS. 1 and 2, a filter 2, a controller 3 and a signal processing unit 4. The sigma-delta modulator 1 serves to excite the micromechanical resonator of the sensor element 50 with a primary oscillation. In order to compensate for a secondary oscillation of the micromechanical resonator, a further sigma-delta modulator (1'), a further filter (2') and a further controller (3') may be provided.

The sigma-delta modulator 1 supplies the electrodes of the micromechanical resonator with its output signal $S_{out}$ (converted to analog) for exciting the primary oscillation and also provides the position signal $S_{pos}$ which represents the current deflection of the primary oscillation of the micromechanical resonator. This position signal can be filtered by a filter 2. The filtered signal is fed to the controller 3. The filter 2 is optional, and its functionality could also be implemented in the controller 3.

The controller 3 generates, as a function of a setpoint value (desired value), the input signal $S_{in}$ for the sigma-delta modulator. The same chain comprising the sigma-delta modulator 1', filter 2' and controller 3' can be provided once more for the secondary oscillation, but the functionality is precisely the same. Only the setpoint value which is predefined for the controller 3' is different since the secondary oscillation is to be adjusted to zero, in contrast to the primary oscillation. A signal processing unit 4 is connected to the controllers 3 and 3', the signal processing unit 4 being able to determine the current rotational speed of the gyroscopic sensor element 50 from the information which is available to the controllers (actual deflection of the primary oscillation and of the secondary oscillation, the current manipulated variables of the controllers for influencing the primary and the secondary oscillations as well as the setpoint values).

The greater part of the sigma-delta modulator 1 and 1' (see above), the filters 2, 2', the controllers 3, 3' and the signal processing unit 4 can be implemented using digital technology. If a suitable fabrication technology for micro-electromechanical systems (MEMS) is used, the entire sensor including the electronics which are necessary for its operation may be integrated in a single chip.

Although examples of embodiments of the present invention have been described herein above in detail, it is desired, to emphasize that this has been for the purpose of illustrating the present invention and should not be considered as necessarily limitative of the invention, it being understood that many modifications and variations can be made by those skilled in the art while still practising the invention claimed herein.

What is claimed is:

1. A sigma-delta modulator comprising:
   a forward branch to which an input signal is fed at an input and which comprises a loop filter, a quantizer and an output for providing an output signal;
   a signal source configured to generate a readout signal that corresponds to a voltage profile at a sensor element during a measuring process;
   a feedback branch comprising an electronic switch connected to receive said output signal and said readout signal, and configured to provide the output signal of the forward branch or the readout signal to the input of the input of the forward branch; and
   a control unit configured to generate a control signal that controls said electronic switch such that only one of the output signal of the forward branch or the readout signal of the signal source is provided to the input of the forward branch at the same time.

2. The sigma-delta modulator of claim 1, wherein the electronic switch comprises a multiplexer that is controllable by the control signal.

3. The sigma-delta modulator of claim 1, further comprising a digital/analog converter to which a feed back signal is supplied.

4. The sigma-delta modulator of claim 3, further comprising a further electronic switch configured to connect an output of the digital/analog converter to the sensor element dependent on the control signal.

5. The sigma-delta modulator of claim 4, wherein the further electronic switch is a multiplexer configured to connect the sensor element to the output of the digital/analog converter as long as the output signal of the forward branch is fed back.

6. The sigma-delta modulator of claim 4, wherein the digital/analog converter comprises a low pass filter.

7. The sigma-delta modulator of claim 1, further comprising a digital/analog converter to which the output signal is supplied.

8. The sigma-delta modulator of claim 7, further comprising a further electronic switch configured to connect an output of the digital/analog converter to the sensor element dependent on the control signal.

9. The sigma-delta modulator of claim 8, wherein the further electronic switch is a multiplexer configured to connect the sensor element to the output of the digital/analog converter as long as the output signal of the forward branch is fed back.

10. The sigma-delta modulator of claim 8, wherein the digital/analog converter comprises a low pass filter.

11. The sigma-delta modulator of claim 1, further comprising a measuring circuit, which is at least temporarily connected to the sensor element.

12. The sigma-delta modulator of claim 11, wherein the further electronic switch is a multiplexer configured to connect the sensor element to the measuring circuit as long as the readout signal of the signal source is fed back.

13. A sensor arrangement for measuring rotational speeds the sensor arrangement comprising:
    a gyroscopic sensor element for measuring rotational speeds with at least one micromechanical resonator;
    a sigma-delta modulator, which is configured to generate an output signal for exciting the micromechanical resonator, and which is configured to measure and provide a position signal representing the deflection of the micromechanical resonator;
    wherein the sigma-delta modulator comprises:
    a forward branch to which an input signal is fed at an input and which comprises a loop filter, a quantizer and an output for providing the output signal;
    a feedback branch configured to feed back the output signal of the forward branch at least temporarily to the input of the forward branch;
    a signal source configured to generate a readout signal which corresponds to a voltage profile at the sensor element during the measuring process; and
    a control unit configured to generate a control signal that controls whether the output signal of the forward branch or the readout signal of the signal source is fed back to the input of the forward branch.

14. The sensor arrangement of claim 13, further comprising a controller to which the measured position signal is supplied and which provides the input signal for the forward branch of the sigma-delta modulator.

15. The sensor arrangement of claim 14, further, comprising a filter coupled between the controller and the sigma-delta modulator.

16. The sensor arrangement of claim 14, further comprising a signal processing unit coupled to the controller and configured to calculate a rotational speed of the gyroscopic sensor element and to provide an output signal which is dependent on the rotational speed.

17. The sensor arrangement of claim 16, where the filter, the controller and the signal processing unit are implemented using digital technology, and the sigma-delta modulator is implemented at least partially using digital technology.

* * * * *